United States Patent [19]

Elenga

[11] Patent Number: 5,231,673
[45] Date of Patent: Jul. 27, 1993

[54] APPARATUS FOR GEOMETRICAL CORRECTION OF A DISTORED IMAGE

[75] Inventor: Cornelis W. Elenga, Eindhoven, Netherlands

[73] Assignee: U.S. Philips Corp., New York, N.Y.

[21] Appl. No.: 677,709

[22] Filed: Mar. 29, 1991

[30] Foreign Application Priority Data

Apr. 2, 1990 [NL] Netherlands ............... 9000766

[51] Int. Cl.⁵ ............................... G06K 9/00
[52] U.S. Cl. .................. 382/6; 364/413.22; 382/44; 382/54; 345/100
[58] Field of Search .............. 382/6, 44, 41, 54; 378/99; 364/413.18, 413.19, 413.22, 715.01; 395/87, 100, 133, 138, 139; 340/723

[56] References Cited

U.S. PATENT DOCUMENTS

| | | | |
|---|---|---|---|
| 3,905,045 | 9/1975 | Nickel | 382/44 |
| 4,430,749 | 2/1984 | Schardt | 382/6 |
| 4,635,293 | 1/1987 | Watanabe | 382/6 |
| 4,736,399 | 4/1988 | Okazaki | 378/99 |
| 4,802,093 | 1/1989 | Ema | 382/6 |
| 4,870,692 | 9/1989 | Zuiderveld et al. | 382/6 |
| 4,975,976 | 12/1990 | Kimata et al. | 382/44 |
| 5,048,103 | 9/1991 | Leclerc et al. | 382/6 |

Primary Examiner—Joseph Mancuso
Attorney, Agent, or Firm—Jack D. Slobod

[57] ABSTRACT

Vertical lines in a distorted image, which are curved by distortion, are converted to straight vertical lines in a first image period. In a subsequent image period horizontal lines in the distorted image, which are curved by the distortion, are converted into straight lines. As the correction is effected in stages, it can be performed in a relatively fast manner, and a corrected image is available after one image period.

17 Claims, 3 Drawing Sheets

APPARATUS FOR GEOMETRICAL CORRECTION OF A DISTORED IMAGE

FIELD OF THE INVENTION

The invention relates to an apparatus for geometrical correction of a distorted image, having an input for receiving a digital video signal comprising image values I(u,v) which belong to image elements, defined by coordinates (u,v), of the distorted image, an output for supplying a digital corrected image signal comprising image values I(x,y) belonging to image elements defined by coordinates (x,y), of a corrected image, an image store connected to the input for storing the digital video signal and an address generator connected to the image store.

The invention also relates to an X-ray examination apparatus including an apparatus for geometrical correction of a distorted image.

BACKGROUND OF THE INVENTION

Such an apparatus is disclosed in the U.S. Pat. No. 4,736,399.

When an X-ray image of an object is produced by detection of the X-rays which are locally intensity-modulated by the object by means of an X-ray image intensifier tube, geometrical distortions are produced in the image. An input screen of the X-ray image intensifier tube is usually curved, which results in a barrel or pin-cushion distortion of the X-ray image to be displayed. The television pick-up device coupled to an output window of the X-ray image intensifier tube also introduces image distortion, as a result of which distances in the ultimate X-ray image do not correspond to the actual dimensions. This is particulary disturbing if quantative data on relative positions of objects must be derived from the X-ray image and, in tomographic imaging, disturbs an accurate image reconstruction. To obviate these disadvantageous effects, the X-ray image is subjected to a geometrical correction, for which purpose the video signal received from the television pick-up device is digitized and stored in a memory of an image correction device. Thereafter image values I(u,v) of the digitized video signal are converted into image values I(x,y) of a corrected video signal. Therein u and v are the coordinates of an image element in the distorted X-ray image, and x and y the coordinates associated with this image element in the corrected X-ray image. For each pair of coordinates (x,y) of the corrected X-ray image the image value I(u,v) associated therewith and stored at an address corresponding to coordinates (u,v), is stored again at an address corresponding to coordinates (x,y). Herein the relation between addresses corresponding to (x,y) and (u,v) are recorded as a vector in a RAM. The corrected image values I(x,y) are applied to a television monitor via a DA converter. Such a method of image correction has the disadvantage that before correction can be effected, the entire X-ray image must first be stored in a memory. Consequently the time required for image correction is relatively long. Particularly during operations while using fluoroscopy it is desirable to have the corrected X-ray images available as quickly as possible.

SUMMARY OF THE INVENTION

The invention has for its object to provide an apparatus with which it is possible to correct an X-ray image of an object within a small number of image periods of a video signal. It is also an object of the invention to provide an apparatus which can effect an image value correction in addition to the image correction for geometrical distortion.

To that end, an apparatus according to the invention includes an image store which comprises a first and a second sub-memory which are connected to a control member for:

driving within a first image period of the video signal the storage of the video signal in the first sub-memory, the address generator generating x-address values for distributing the image values I(u,v) over addresses corresponding to coordinates (x,v) of image elements in a partly corrected image and which comprise an x-address value and v-address value, and for applying to the output a video signal which was stored in the second sub-memory during a preceding image period, as well as for driving within a subsequent image period reading of the first sub-memory, the address generator generating y-address values for selecting addresses comprising an x-address value and an y-address value which correspond to consecutive coordinates (x,y) arranged along image lines in the corrected image for applying the image values stored at these addresses to the output, as well as for entering during the image period the video signal applied to the input into the second sub-memory.

The image values I(u,v) of the digitized video signal are stored in a first image period at addresses XV in the first sub-memory, whereby the vertical lines which in the distorted image were curved by geometrical distortion, are corrected to straight lines. In the subsequent image period the image values stored at the addresses XV are applied to the output in a sequence determined by the address generator. In this situation, the image values, for example, are applied as a time sequence to the output, consecutive image values being located along image lines in the corrected image. Simultaneous with reading of the first sub-memory and applying of the image values I(x,v) to the output in the correct sequence, the new incoming video signal is stored in the second sub-memory at addresses XV. Because of the phased image correction it is possible to have the corrected images available after one image period (40 ms).

In a preferred embodiment of an apparatus in accordance with the invention an address generator includes a first Table with x-address values belonging to coordinates (u,v) and a second Table with y-address values belonging to coordinates (x,v).

The address generator generates within one image period simultaneously x-address values of addresses XV which correspond to coordinates (x,v) in the partly corrected image and y-address values of addresses XY which correspond to coordinates (x,y) in the undistorted image. As the address generator performs assigning of the pairs of coordinates (x,y) in the undistorted image, belonging to a pair of coordinates (u,v) of the distorted image in two steps, a parallel addressing can be used. During an image period the x-address values for the incoming video signal, and the y-address values for a video signal recorded during a preceding image period are generated simultaneously. This renders it possible for an image correction of an image discretized into 512*512 image elements to be significantly faster than the prior art image correction method.

In a further preferred embodiment of an apparatus in accordance with the invention a control means applies at each image value I(u,v) an u-address value and a v-address value, corresponding to the coordinates (u,v) of the associated image elements, of addresses UV to the address generator, the address generator including a first Table with address incrementing values Δu stored at addresses UV, an adder arrangement for assembling the x-address value from the sum of the u-address value and the address incrementing value Δu, a Table with address incrementing values Δv stored at addresses UV and a further adder arrangement for assembling the y-address values from the sum of the v-address value and the address incrementing value Δv.

Since the address incrementing values, which are formed by smaller numbers (6 bit) than the overall x- or y-address values (9 bit), are stored in the address generator, the required memory space can be reduced by a factor of ⅓.

In a still further preferred embodiment of an apparatus in accordance with the invention the apparatus includes a third memory connected to the control means and to a multiplier for multiplying the video signal I(x,y) by a correction factor stored in the third memory, and for supplying the multiplied video signal to the output.

After geometrical image correction, the signal values are corrected for, for example, a brightness variation in the X-ray image due to the geometry of an input screen of the X-ray image intensifier tube or inhomogeneities of the X-ray beam.

In an embodiment of the apparatus in accordance with the invention the control means includes a counter, the first and second submemories comprising RAM-memories, the respective read-write selection inputs of the sub-memories being connected to the counter in an inverted mode relative to each other for the supply of a periodical logic-high signal with a period equal to two image periods.

The counter, for example a 19-bit binary counter, generates binary numbers at the counter output at, for example, a clock rate of 6.6 MHz. At this frequency 512*512 numerical values are generated within a 40 ms image period. The output of the counter at which the most significant bit (the 19th bit) appears is connected to the read-write selection inputs of the sub-memories, as a result of which, during a first number of $512^2$ clock pulses of the counter, a logic low level is applied to the read-write select input of the first sub-memory and a logic level to the read-write select output of the second sub-memory. After $512^2$ clock pulses, that is after one image period, a logic high level is present at the counter output having the most significant bit, so that the sub-memory which is in the write mode is adjusted to the read mode, and the sub-memory that is in the read mode is adjusted to the write mode. Such a control unit is simple to realize on the basis of prior art logic components.

In a further embodiment of an apparatus in accordance with the invention, a gate circuit is between the input and the output the gate circuit comprises four three-state buffers each having an activating input connected to the control member, a series arrangement of the first and second buffers being arranged in parallel with a series arrangement of the third and fourth buffers, the inputs of the first and third buffers being connected to the input, the outputs of the second and fourth buffers being connected to the output, the activating inputs of the first and the fourth buffer being inverted relative to the activating inputs of the second and the third buffer, and a node between the first and second buffers being connected to the first submemory and a node between the third and the fourth buffer being connected to the second sub-memory.

The gate circuit, switching-over per image period, applies image values from the input to one of the sub-memories and corrected image values from the other sub-memory to the output.

IN THE DRAWING

Some embodiments of an apparatus according to the invention will now be described in greater detail with reference to the accompanying drawings. In the drawing.

DESCRIPTION OF THE PREFERRED EMBODIMENTS

Figure 1:
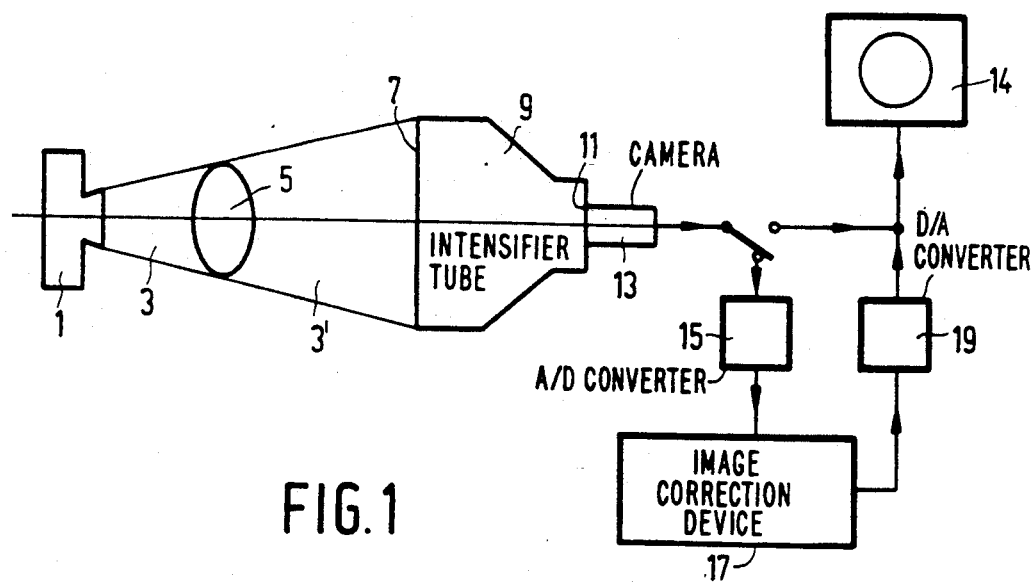
FIG. 1 shows an X-ray examination apparatus provided with an arrangement for image correction.

FIG. 1 shows an imaging system, more specifically an X-ray imaging system, in which an X-ray beam 3 emitted by an X-ray source 1 is locally intensity-modulated by an object 5. A modulated X-ray beam 3' is incident on an input screen 7 of an X-ray image intensifier tube 9 and is there converted into a fluorescent image which is displayed on an output screen 11 after its intensity has been amplified in an electron-optical manner via electrons released in a photocathode. A television camera 13 converts the fluorescent image into an electric video signal which can be applied to a display unit 14 for display as a visible image. Via an analog-to-digital converter 15 the video signal is applied to an image correction device 17, in which geometrical distortion is digitally corrected. The device 17 applies the digital image values in a predetermined sequence to a digital-to-analog converter 19 for display by means of the display unit 14. When medical surgery is performed on internal structures of a patient, such as arteries, while performing fluoroscopy, it is of importance for a proper recognition of the structures that these are geometrically displayed in as faithful a manner as possible. Also with tomographic imaging, in which a three-dimensional image is reconstructed from a series of two-dimensional absorbtion profiles of an object, it is important for an accurate image reconstruction that the absorbtion profiles are free from geometrical distortions. In the image to be displayed, these distortions are produced by a curvature of the input screen 7, the position of the electronoptic system of the X-ray image intensifier tube 9 relative to the geomagnetic field and by an optical system, if any, arranged between the output screen of the X-ray image intensifier tube 9 and the television camera 13.

Figure 2A:
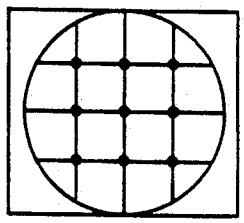
FIGS. 2a–2c shows possible distortions in an image to be displayed.
Figure 2B:
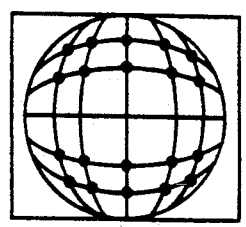
Figure 2C:
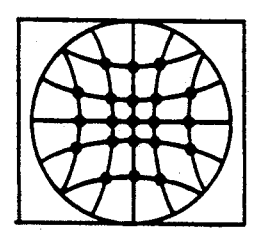

FIG. 2a shows image elements arranged along straight lines in a rectangular system of coordinates (x,y). These elements are located along curved lines due to barrel or pin-cushion distortion (FIG. 2b and FIG. 2c, respectively). An image of a test object formed by a rectangular mesh structure of X-ray absorbing material (FIG. 2a) is displayed in a distorted manner, FIGS. 2b and 2c. An image on the output screen 11 of the X-ray image intensifier tube 9 is converted by the television camera 13 into a video signal for display on the display unit 14 in accordance with an interlaced line pattern assembled from two interlaced image fields. Image pick-up can be effected with the aid of a camera pick-up tube in which a charge image corresponding to a fluorescent image on a photo-conductive layer is scanned as two interlaced image fields by an electron beam. The television camera may alternatively include a CCD camera, in which a charge pattern which is formed in a layer of semiconductive material under electrodes, is transferred in accordance with, for example, a frame transfer method in one run to a memory matrix of CCD cells. Thereafter a second charge pattern is formed in the semiconductor material in positions which are shifted relative to the first pattern, while a line-sequential reading of the charge pattern stored in the memory matrix is effected, a video signal which is proportional to the charge then being produced. In synchronism with the operation of reading the charge images in the television camera 13, the video signal thereby generated is displayed on the display unit 14. The video signal, generated by the television camera and digitized thereafter, represents the image values of a distorted image located in an image plane defined by coordinates (u,v).

Figures 3A, 3B:
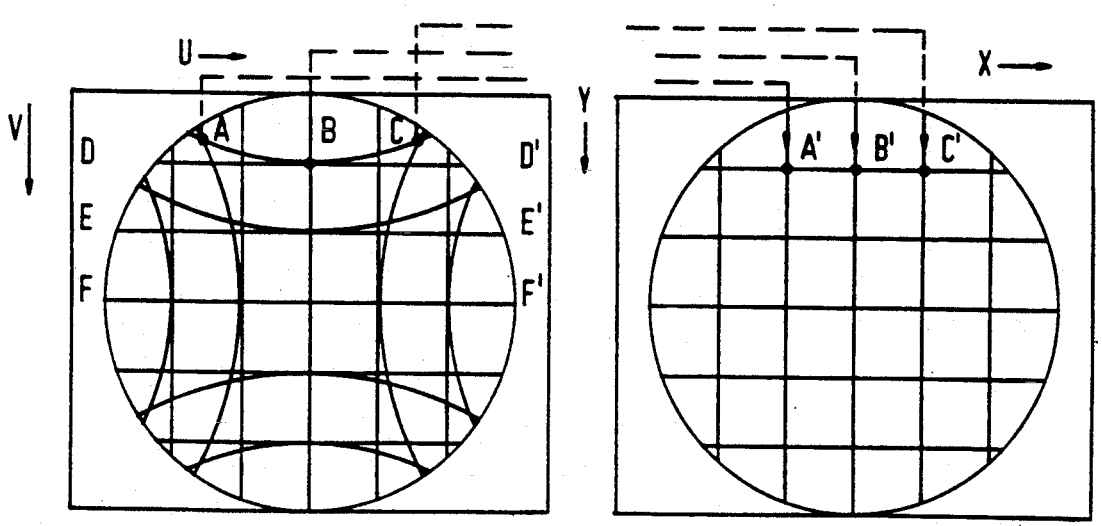
FIGS. 3a and 3b are a schematic representations of the prior art mode of image correction.

In the prior art image correction arrangement the image values I(u,v) are stored at addresses UV in a first memory of the image correction device 17. Then, the addresses UV form a matrix which corresponds to the coordinates (u,v). As is shown in FIG. 3a and 3b the stored digitized image is corrected image element sequentially. To that end, the image values I(u,v) of the digitized image are again stored in a second memory of image correction device 17 at addresses XY arranged in a matrix which corresponds to coordinates (x,y) of the undistorted image. The memory in which the image values I(u,v) have been stored is read along, for example, the consecutive lines DD', EE', FF' etc, the points A, B and C then being stored at the addresses A', B' and C' which are located on a horizontal line in the matrix of addresses XY. The relationship between the addresses UV and XY (or between the point (u,v) and (x,y) is determined with the aid of the image of a test object in the shape of an X-ray absorbing mesh. After correction, the addresses XY are applied in a sequence which corresponds to interlaced image lines to the display unit 14 via the digital-to-analog converter 19.

Figure 4A:
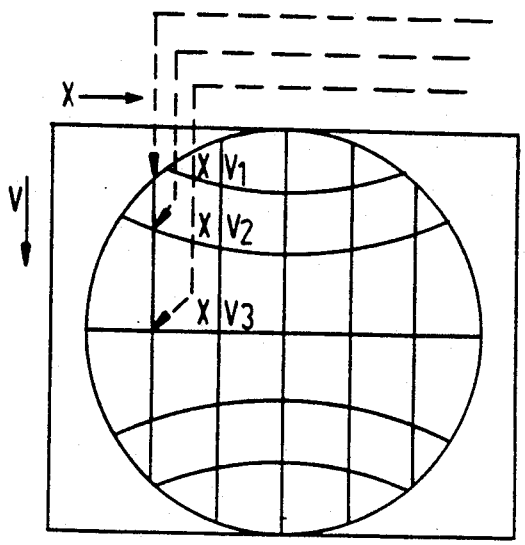
FIGS. 4a and 4b shows a manner of image correction using an apparatus in accordance with the invention.
Figure 5:
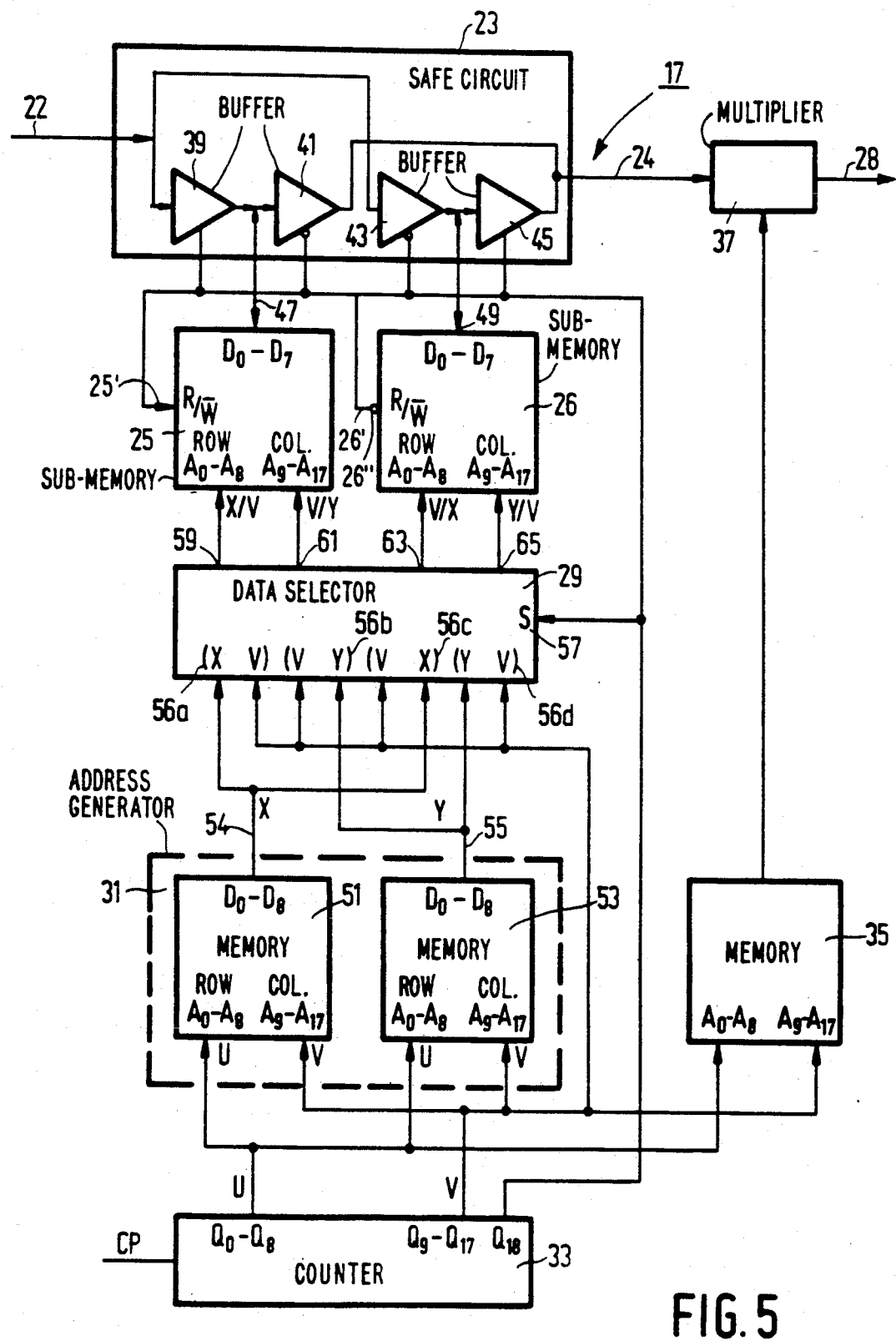
FIG. 5 shows an apparatus in accordance with the invention.

In an image correction device in accordance with an embodiment of FIG. 5 the invention, the image values I(u,v) belonging to coordinates (u,v) of the distorted image are stored in a first image period at addresses XV in a first sub-memory 25. To that end an address generator 31 supplies for each image value I(u,v) an address value of the address XV at which the relevant image value is stored. In response thereto, vertical lines in the distorted image which are curved by distortion, are converted into straight lines. FIG. 4a shows a picture of a rectangular mesh distributed over a matrix of addresses XV after the first correction stage.

Figure 4B:
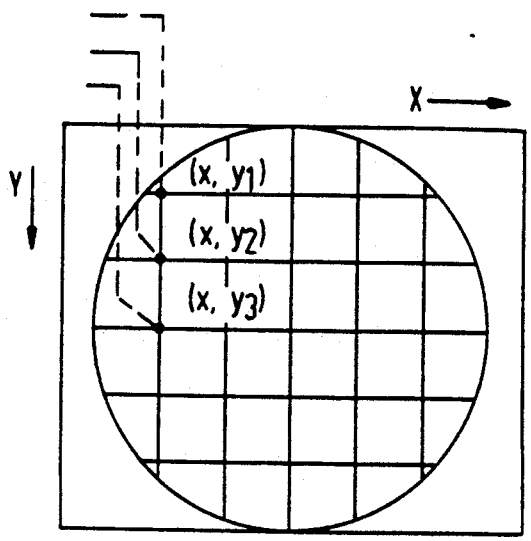

During a subsequent correction stage included in the subsequent image period, the contents of the addresses XV are applied in a sequence to the output of the correction device 17, this sequence corresponding to consecutive image elements are arranged along a pattern of image lines. For that purpose, the address generator 31 selects for image elements (x,y) (FIG. 4b) located along vertical lines, a y-address value and applies the associated image values stored at addresses XV whose v-address value is equal to the y-address value (V=Y) to the output. FIGS. 4a and 4b show how in the image plane 4b defined by image elements (x,y) for consecutive image elements $(x,y_1)$, $(x,y_2)$ and $(x,y_3)$ located along a vertical line the associated image values are found at the addresses $XV_1$, $XV_2$ and $XV_3$ of the addresses arranged in a matrix, as is shown in FIG. 4a. The address generator 31 generates the y-address values of the addresses $XV_1$, $XV_2$ and $XV_3$ associated with the image elements $(x,y_1),(x,y_2)$ and $(x,y_3)$. The content of the addresses XV, for which it holds that V=Y in the matrix of addresses XV is applied to the output 28 of the image correction device 17 at a predetermined rate, so that a corrected image appears on the display device 14. After an image correction of the type described above, the corrected image is rotated through 90° relative to the distorted image. This can be remedied by using an additional correction step, or by a proper orientation of the recording means or by a proper orientation of the display means 14.

The image correction device 17 includes control means comprising a counter 33, an address generator 31, a data selector 29 and a gate circuit 23. Connected to the gate circuit 23 are two random access (RAM) sub-memories 25 and 26 for storing image values and applying them to the gate circuit 23. The contents of the sub-memories 25 and 26 are applied to the output 28 of the image correction device via the gate circuit 23. The sub-memories 25 and 26 are connected to address generator 31 via data selector 29. Counter 33, which may comprise, for example, a binary counter, is connected to the address generator 31, the data selector 29, the sub-memories 25 and 26 and the gate circuit 23 for the purpose of synchronous address generation and data storage and data release into and from, respectively, the sub-memories 25 and 26. The counter 33 is also connected to a third memory 35 an output of which is connected to a multiplier 37 for multiplying the image values supplied by the gate circuit 23 by a correction factor supplied by the memory 35.

An image which is discretized into $512^2$ image elements is applied as a series of time-sequential image values to the input 22 of the correction circuit 17. At an image period of 40 ms, a rate at which the image values enter amounts, for example, to 6.6 MHz. The counter 33 may comprise a 19-bit binary counter which is driven with a clock rate of 6.6 MHz. A logic high or a logic low level appears with a frequency of 12.5 Hz (which corresponds to two image periods) at the 19th output of the control member 33 which represents the most significant bit, Q18. When the output Q18 is at the high level, the logic high signal activates the gate circuit 23 such, that the input 22 is connected to the read-write (R/W) input 47 of the sub-memory 25 via a buffer 39. The read-write (R/W) input 49 of the sub-memory 26 is isolated from the input 22 by a buffer 43. The read-write input of the sub-memory 25 is isolated from the output 24 by a buffer 41, whereas the read-write input of the sub-memory 26 is connected to the output 24 via a buffer 45. The buffers 39, 41, 43 and 45 are three-state logics buffers which, in dependence on the activating signal generated by the counter 33 convey a signal at their input to their output or have their input isolated from their output. Buffers 39 and 45 have activating inputs connected to the Q18 output of counter 33. Buffers 41 and 43 have their activating inputs connected to the counter Q18 output via inverters. Simultaneously, a logic high signal is applied to the read-write selection input R/W 25' of the sub-memory 25 and a logic low signal via inverter 26", to the read-write selection input R/W 26' of the sub-memory 26. In response thereto the sub-memory 25 is adjusted to a read state and the sub-memory 26 to a write state. The image values incoming via the input 22 are entered into the sub-memory 25 whilst simultaneously the content of the sub-memory 26 is applied to the output 24. After one image period the signal at the output Q18 of the counter 33 changes into a logic low level so that the sub-memory 25 is adjusted to the write state and is connected to the output 24 via a buffer 41, whilst the sub-memory 26 is adjusted to the read state and is connected to the input 22 via the buffer 43.

The address generator 31 includes two read-only memories (ROM) 51 and 53 each having $512^2*9$ bits memory locations and which form, for example, respective first and second coordinate tables. At the outputs Q0 to Q8, inclusive, of the counter 33 the 9 least significant bits appear which form a u-address value of image value I(u,v) present at that moment at the input 22, the outputs Q0–Q8 being connected to inputs A0 to A8, inclusive, of the memories 51 and 53. Leaving the last bit out of account, there appear at the outputs Q9 to Q17, inclusive, the 9 most significant bits which constitute the v-address value of the image value I(u,v) applied at that instant to the input 22. The outputs Q9–Q17 are connected to inputs A9 to A17, inclusive, of the memories 51 and 53. Each memory location in the memories 51 and 53 is represented as two 9 bit address number which define the relative position of a memory element within a matrix of 512*512 memory elements. The inputs A0–A8 define a row in the matrix of memory elements and the inputs A9–A17 define a column. Incrementing the binary number at the inputs A0–A17 step-wise, results in the memory elements located consecutively along a row in the matrix of memory elements to be energized sequentially. The number pairs UV forming the addresses of the memory 51, correspond to coordinates (u,v) of the distored image. At each address UV an x-address value has been stored which corresponds to an x-coordinate of an element (x,y) in the undistorted image, which element is associated with the element (u,v) of the distorted image. In the memory 53 the number pairs UV which form the addresses correspond to positions (x,v) of elements in a partly corrected image, the vertical lines which were curved by distortion having been corrected to straight vertical lines. At the addresses UV of the memory 53 y-address values are stored which correspond to a y-coordinate of elements (x,y) in the undistorted image.

The output 54 of the memory 51 and the output 55 of the memory 53 are each connected to two inputs of the data selector 29. The data selector 29 has four pairs of input terminals 56a to 56d, each input terminal being suited to the reception of a 9-bit number. A selection input 57 of the data selector is connected to the output Q18 of the counter 33. For each pair of input terminals the data selector 29 is provided with an output terminal, an input terminal of each pair of input terminals being connected to the output terminal in dependence on the signal on the selection input 57. The output terminals 59 and 61 of the data selector are connected to address inputs A0–A8 and A9–A17 of the sub-memory 25, whilst the output terminals 63 and 65 of the data selector are connected to address inputs A0–A8 and A9–A17 of the sub-memory 26. In response to a logic high signal at the selection input 57, the data selector 29 of the sub-memory 25 connects the address inputs A0–A8 to x-address values, generated by the address generator 31, of the address XV and the address inputs A9–A17 to a v-address value of the address XV, the v-address value being given by the most significant portion of the binary number generated by the counter 33 on the output terminals Q8–Q17. As a result thereof, the image values I(u,v) incoming at the input 22 are entered into the sub-memory 25 at addresses XV. At the same time, the data selector 29 of the sub-memory 26 connects the address inputs A0–A8 to the v-address value and the address inputs A9–A17 to the y-values, so that image values stored at addresses VY (which as a result of the first correction stage correspond to the addresses XY) and originating from the sub-memory 26 are applied to the output 24. When the selection input 57 changes to the low state after one image period, the functions of the submemories 25 and 26 are interchanged, so that writing is effected in the now empty submemory 26 at addresses XV and reading from the sub-memory 25 is effected at addresses XY.

Figure 6:
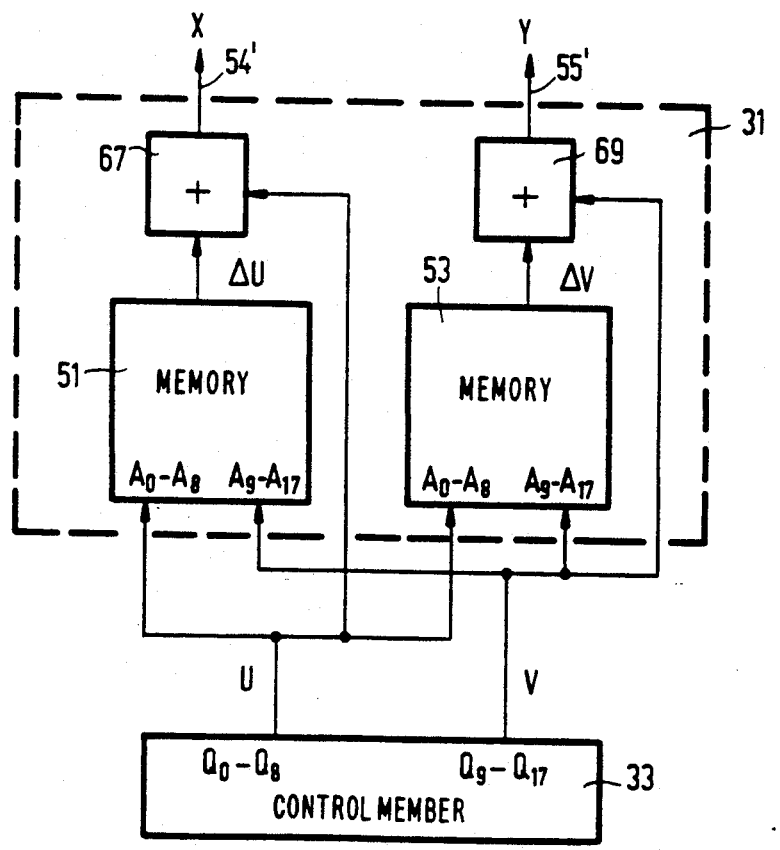
FIG. 6 shows diagrammatically in more detail the address generator of FIG. 5.

FIG. 6 shows an embodiment of the address generator 31, the respective address incrementing values Δu and Δv being stored in the memories 51 and 53. The capacity of the memories 51 and 53 amounts in this case to $512^2*6 = 1.6$ Mbits. For each image value I(u,v) the counter 33 generates the u-address value at the outputs Q0–Q8 and the v-address value at the outputs Q9–Q17. For each image element value I(u,v) an address incementing value Δu is applied to an adder 67. The counter 31 applies the u-address value to the adder 67 which, by adding together the u-address value and the address incrementing value Δu produces the x-address value, X. The x-address value is applied to the data selector 57 via the output 54'. In a similar manner the adder arrangement 69 produces from the v-address value and the address incrementing value Δv the y-address value Y, which is applied to the data selector 57 via the output 55'.

It should be noted that in addition to its use in an X-ray imaging system the invention is of general usage in an imaging system in which geometrical distortions occur.

What is claimed is:

1. Apparatus for geometrical correction of a distorted image represented by an input digital video signal to form an distortion corrected output video signal representing a distortion corrected image corresponding to the distorted image, said input digital video signal comprising an input sequence of values of image elements in an order indicative of first and second coordinates of the image elements in the distorted image, said apparatus comprising:

memory means for storing values of image elements at address locations organized into first and second coordinates of the image elements;

control means coupled to said memory means for writing the input sequence of values of image elements comprised by said input digital video signal into said memory means at address locations manifesting a distortion corrected first coordinate of said image elements and for reading an output sequence of values of image elements from said memory means in an address location order manifesting a distortion corrected second coordinate of said image elements, said output sequence of image elements forming the output digital video signal.

2. Apparatus as claimed in claim 1, wherein said memory means has a pair of sets of address locations for storing values of image elements in respective different alternate image periods; and wherein said writing the input sequence of values of image elements is into one of said sets of address locations and said reading of the output sequence of values is from the other of said sets of address locations, whereby said input sequence of values of image elements representing a distorted image is written into the memory means in an image period and an output sequence of image values representing a distortion corrected image corresponding to the distorted image period is read from the memory means in the next following image period.

3. Apparatus as claimed in claim 1, wherein said writing the input sequence of values of image elements into one of said sets of address locations is done simultaneously with said reading of the output sequence of values from the other of said sets of address locations.

4. An apparatus for geometrical correction of a distorted image, said apparatus having an input for receiving a digital video signal comprising image values I(u,v) of image elements defined by coordinates (u,v) of the distorted image and an output for supplying a digital corrected image signal comprising image values I(x,y) of image elements defined by coordinates (x,y) of a corrected image, said apparatus comprising:
   image storing means comprising first and second sub-memories coupled to the input for storing the digital video signal;
   address generator means coupled to the image storing means; and
   control means comprising means, within a first image period of the video signal, for storing the video signal in the first sub-memory by causing the address generator to generate x-address values for distributing the signal image values I(u,v) over first sub-memory addresses corresponding to coordinates (x,v) of image elements in a partly corrected image and which first sub-memory addresses comprise an x-address value and a v-address value, for applying to the output a video signal stored in the second memory during a preceding image period by causing the address generator to generate y-address values for selecting addresses comprising an x-address value and a y-address value which selected x,y values correspond to consecutive coordinates (x,y) arranged along image lines in the corrected image to apply the image values stored at these addresses in the second sub-memory to said output and for entering during an image period subsequent to the first period the video signal applied to the input into said second sub-memory and for reading within said subsequent image period the first sub-memory.

5. An apparatus as claimed in claim 4 wherein the address generating means includes a first Table with x-address values associated with coordinates (u,v) and a second Table with y-address values associated with coordinates (x,v).

6. An apparatus as claimed in claim 5 wherein said memory means includes a third memory coupled to said control means and to a multiplier for multiplying the video signal I(x,y) by a correction factor stored in the third memory, and for supplying the multiplied video signal to the output.

7. An apparatus as claimed in claim 5 wherein said control means includes a counter, the first and second sub-memories comprising RAM-memories having read/write selection inputs, the respective read-write selection inputs of the sub-memories being connected inversely to the counter relative to each other for the supply of a periodical logic signal of a given level with a period equal to two image periods.

8. An apparatus as claimed in claim 4 wherein said control means includes means for applying at each image value I(u,v) a u-address value and a v-address value, corresponding to the coordinates (u,v) of the associated image elements, of addresses UV to the address generating means, the address generating means including a first Table with address incrementing values $\Delta u$ stored at addresses UV, adder means for assembling each x-address value from the sum of a u-address value and an address incrementing value $\Delta u$, a Table with address incrementing values $\Delta v$ stored at addresses UV and a further adder means for assembling each y-address value from the sum of a v-address value and an address incrementing value $\Delta v$.

9. An apparatus as claimed in claim 8 wherein said memory means includes a third memory coupled to said control means and to a multiplier for multiplying the video signal I(x,y) by a correction factor stored in the third memory, and for supplying the multiplied video signal to the output.

10. An apparatus as claimed in claim 9 wherein said control means includes a counter, the first and second sub-memories comprising RAM-memories having read/write selection inputs, the respective read-write selection inputs of the sub-memories being connected inversely to the counter relative to each other for the supply of a periodical logic signal of a given level with a period equal to two image periods.

11. An apparatus as claimed in claim 8 wherein said control means includes a counter, the first and second sub-memories comprising RAM-memories having read/write selection inputs, the respective read-write selection inputs of the sub-memories being connected inversely to the counter relative to each other for the supply of a periodical logic signal of a given level with a period equal to two image periods.

12. An apparatus as claimed in claim 4 wherein said memory means includes a third memory coupled to said control means and to a multiplier for multiplying the video signal I(x,y) by a correction factor stored in the third memory, and for supplying the multiplied video signal to the output.

13. An apparatus as claimed in claim 12 wherein said control means includes a counter, the first and second sub-memories comprising RAM-memories having read/write selection inputs, the respective read-write selection inputs of the sub-memories being connected inversely to the counter relative to each other for the supply of a periodical logic signal of a given level with a period equal to two image periods.

14. An apparatus as claimed in claim 4 wherein said control means includes a counter, the first and second sub-memories comprising RAM-memories having read/write selection inputs, the respective read-write selection inputs of the sub-memories being connected inversely to the counter relative to each other for the supply of a periodical logic signal of a given level with a period equal to two image periods.

15. An apparatus as claimed in claim 14 wherein said control means includes between the input and the output a gate circuit comprising four three-state buffers each having an activating input coupled to the counter, a series arrangement of first and second buffers in parallel with a series arrangement of third and fourth buffers, the inputs of the first and third buffers being connected to the apparatus input, the outputs of the second and fourth buffers being connected to the apparatus output, the activating inputs of the first and fourth buffer being inverted relative to the activating inputs of the second and the third buffer, and a node between the first and second buffers connected to the first sub-memory and a node between the third and the fourth buffer connected to the second sub-memory.

16. An apparatus having an input and an output, said apparatus for geometrical correction of a distorted image manifested by a digital video signal applied to said input, said signal comprising image values I(u,v) of image elements defined by coordinates (u,v) of the distorted image, said apparatus comprising:

memory means including first and second sub-memories for storing said applied digital video signal;

address generating means coupled to said memory means for addressing said sub-memories; and control means coupled to said memory means and address means for:

1) causing the address generating means to generate address values for distributing the image values I(u,v) of the applied signal to 1) said first sub-memory in a first period at memory addresses each corresponding to an image element wherein said address values for the first sub-memory comprise a first coordinate address value (x,v) corresponding to a first corrected coordinate (x) of said image elements and 2) said second sub-memory in a second period preceding the first period at memory addresses each corresponding to an image element wherein said address values for the second sub-memory comprise a second coordinate address value (v,y) corresponding to a second corrected coordinate (y) of said image elements;

2) causing the address generator means to generate (x,y)-address values for selecting in the first period addresses comprising an x-address value and a y-address value of said second sub-memory which x and y address values correspond to consecutive coordinates (x,y) along image lines in a corrected image and for applying the image values stored at these addresses in said second sub-memory to said output;

3) entering said digital video signal into said second sub-memory during a period subsequent to said first period; and 4) reading said first sub-memory during said subsequent period.

17. An X-ray examination apparatus comprising:

an X-ray image intensifier tube for forming an output signal in response to an applied X-ray image;

an X-ray source for applying said X-ray image to said tube;

television pick-up means for forming a digital video signal from said output signal; and signal correction means having an input and a second output, said signal correction means for geometrical correction of a distorted image manifested by said digital video signal applied to said input, said signal comprising image values I(u,v) of image elements defined by coordinates (u,v) of the distorted image, said correction means comprising:

memory means including first and second sub-memories for storing said applied digital video signal;

address generating means coupled to said memory means for addressing said sub-memories; and control means coupled to said memory means and address means for:

1) causing the address generating means to generate address values for distributing the image values I(u,v) of the applied digital signal to 1) said first sub-memory in a first period at memory addresses corresponding to coordinates (x,y) of image elements of a partly corrected image wherein said address values for the first sub-memory comprise a first coordinate address value (x,v) corresponding to a first corrected coordinate (x) of said image elements and 2) said second sub-memory in a second period preceding the first period at memory addresses corresponding to coordinates (x,y) of image elements of an image wherein said address values for the second sub-memory comprise a second coordinate address value (v,y) corresponding to a second corrected coordinate (y) of said image elements;

2) causing the address generator means to generate (x,y)-address values for selecting in the first period addresses comprising an x-address value and a y-address value of said second sub-memory which x and y address values correspond to consecutive coordinates (x,y) along image lines in the corrected image and for applying the image values stored at these addresses in said second sub-memory to said output;

3) entering said digital video signal into said second sub-memory during a period subsequent to said first period; and 4) reading said first sub-memory during said subsequent period.

\* \* \* \* \*